June 13, 1939. C. R. HANNA 2,162,482
REGULATOR WITH GYROSCOPIC ANTIHUNTING
Filed June 19, 1937 2 Sheets-Sheet 1

WITNESSES:
Wm. B. Sellers
F. E. Hardy

INVENTOR
Clinton R. Hanna.
BY Ezra W. Savage
ATTORNEY

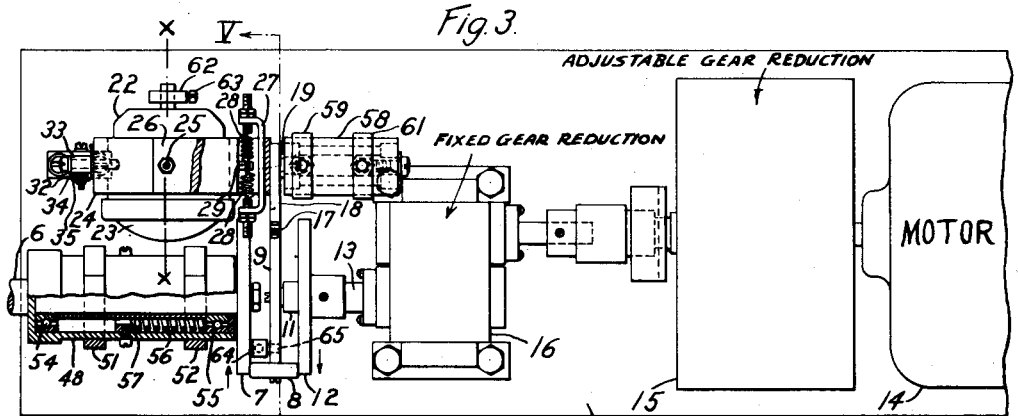
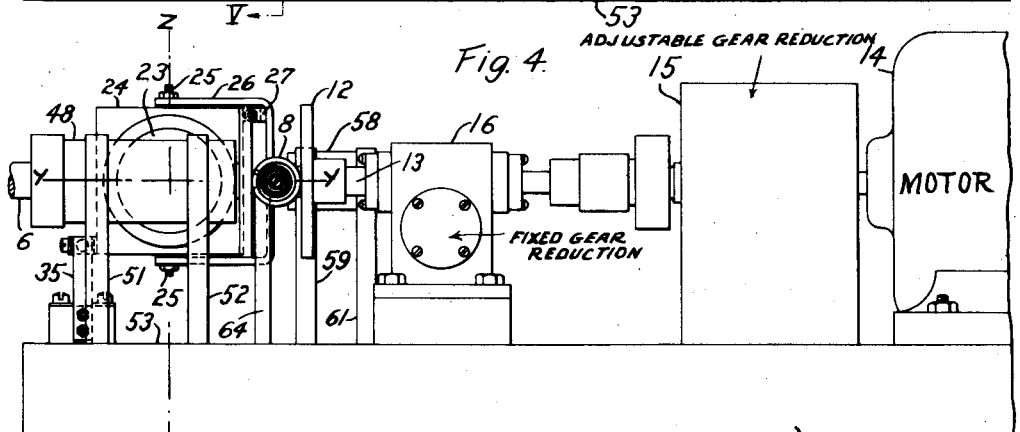
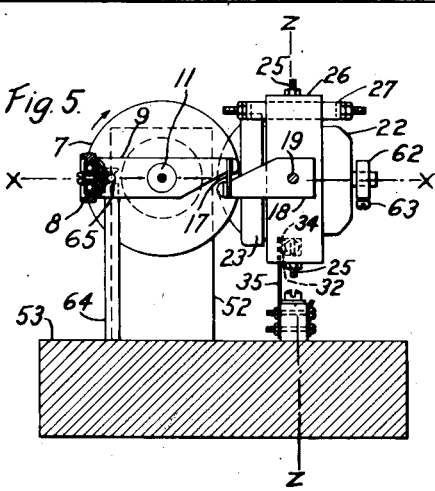

Patented June 13, 1939

2,162,482

UNITED STATES PATENT OFFICE 2,162,482

REGULATOR WITH GYROSCOPIC ANTIHUNTING

Clinton R. Hanna, Pittsburgh, Pa., assignor to Westinghouse Electric & Manufacturing Company, East Pittsburgh, Pa., a corporation of Pennsylvania Application June 19, 1937, Serial No. 149,186

9 Claims. (Cl. 172—239)

My invention relates to a position regulator or speed matcher having gyroscopic anti-hunting control.

In certain systems for governing the position of a movable controlled element in accordance with a change in the position of a controlling element, where the amount of movement is small, and precession is required such that the controlling force must be varied as the controlled member approaches its newly corrected position to prevent over-travel, it is impractical to employ the usual types of inertia responsive governor devices for effecting the corrective action of the control system.

This is also true of speed matching systems and particularly in such systems where the controlled element moves at a slow speed so that the usual type of inertia governor is ineffective unless driven at a much higher speed.

In such cases, it is possible to employ a continuously revolving gyroscopic element that is mounted to possess a freedom of motion about two axes at right angles to each other and at right angles to the axis of revolution of the revolving element, which gyroscopic element possesses the property of moving or precessing about one of the axes at right angles to the axis of spin, when moved about the other axis at right angles to the axis of spin. Such an inertia or gyroscopic device may be employed to introduce two corrective movements, one of which is the initial movement determined by the direction and amount of variation in the regulated quantity from its desired value and which is directly applied to the gyroscopic element, and the other of which is the movement of the gyroscope at right angles to this axis, or about the axis of precession and which is a measure of the rate of change of the regulated quantity from its desired value. Because of the nature of the movements of a gyroscope it may be employed to introduce an anti-hunting influence into the control system to prevent over-travel of the regulated quantity, by causing the control element to vary its position prior to the completion of the corrective influence.

The regulated quantity may be controlled in accordance with movements of the gyroscope through electric circuits and of contact members controlled by the gyroscope.

It is an object of my invention to provide a position regulator or speed matching mechanism having a corrective influence that is sensitive to the magnitude and direction of a variation in a regulated quantity from its desired value and that is provided with additional corrective means that is sensitive to the rate of departure of the regulated quantity from its desired value.

More specifically stated, it is an object of my invention to provide a control mechanism having a corrective influence that is sensitive to the magnitude and direction of a variation in the regulated quantity from its desired value and that is provided with a gyroscope for introducing an anti-hunting influence into the control system to counteract the initial corrective action to prevent over-travel thereof, the anti-hunting influence being sensitive to the rate of departure of the controlled quantity from its desired value.

Other advantages and objects of my invention will be apparent from the following description of an embodiment thereof, reference being had to the accompanying drawings, in which:

Figs. 3 and 4 are top plan and front elevational views, respectively, of a portion of the mechanism illustrated in Fig. 1; and, Fig. 5 is a sectional view taken along the lines V—V in Fig. 3.

Figure 1:
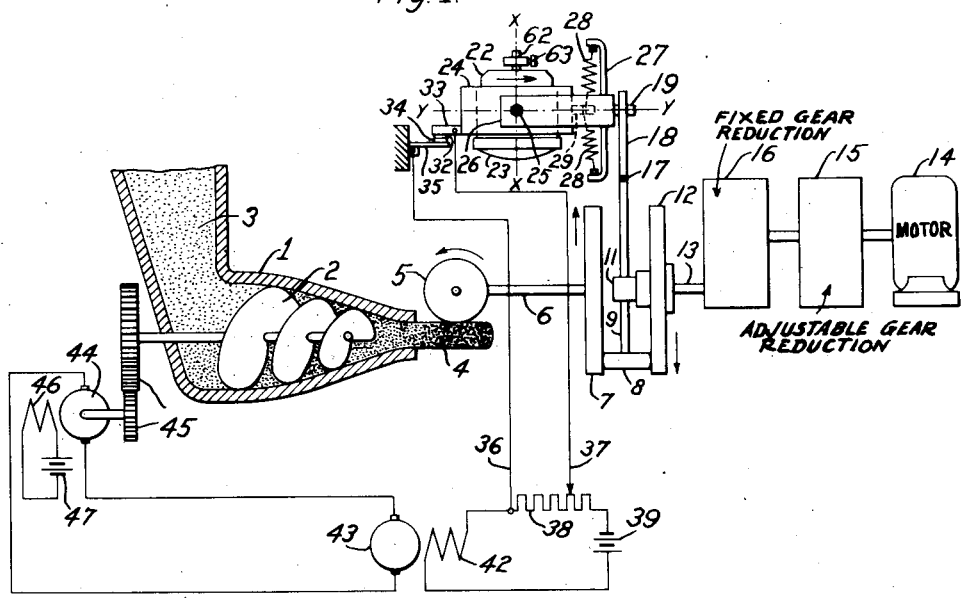
Figure 1 is a diagrammatic view of apparatus and circuits illustrating the application of my invention to the control of a pug mill.

Referring to Fig. 1, a pug mill is diagrammatically represented as indicated by the numeral 1, having means shown as the worm screw 2 for ejecting the prepared particles of clay 3 in the form of a cylindrical pug 4 suitable for cutting or slicing and shaping into china plates or the like. A wheel 5 is provided for frictional engagement with the pug 4 as it comes from the pug mill, and is adapted to rotate at a speed that is indicative of the rate of advance of the pug 4 from the mill. This wheel is connected by a shaft 6 to a friction disc 7 that frictionally engages one side of a roller 8 that is mounted on a shaft 9, supported in a bearing 11 that is aligned with the axis of the shaft 6. The other side of the roller 8 engages a driving disc 12 that is similar to the disc 7, and that is mounted on a shaft 13 that is also axially aligned with the shaft 6, and is driven by a motor 14 through an adjustable gear reduction mechanism 15 and a fixed gear reduction mechanism 16.

The outer end of the shaft 9 that moves about the axis of shafts 6 and 13 is connected at 17 to a lever 18 that is fixedly attached to a shaft 19 and to move a gyroscope structure mounted thereon and movable about the axis of the shaft 19.

Figure 2:
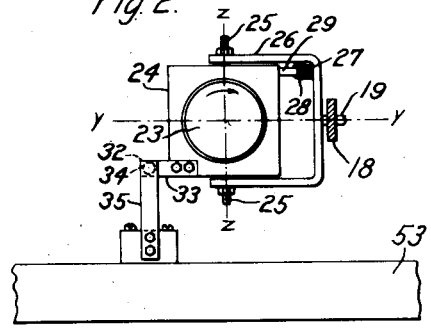
Fig. 2 is a diagrammatic view of a portion of the gyroscope structure illustrated in Fig. 1.

The gyroscope structure consists of an inertia element 22 that is driven by a motor (not shown) enclosed within the housing 23 to rotate rapidly about the axis X—X as shown in Fig. 1, which is at right angles to the paper, as viewed in Fig. 2. The casing 23 is mounted within a rectangular support 24 carried in bearings 25 at the top and bottom thereof supporting the structure within a U-shaped member 26, best shown in Fig. 2, as carried by the shaft 19 and free to move about the axis Y—Y thereof, which is at right angles to the axis of spin X—X of the inertia element 22. The mounting of the member 24 in the studs 25 permits the movement of the inertia element 22, together with the parts carried by the rectangular support 24, to move about the axis of precession Z—Z, shown as the vertical axis in Fig. 2, and at right angles to the paper in Fig. 1. Arms 27, best shown in Fig. 1 extend in opposite directions from the U-shaped member 26 near the top thereof to support a pair of spring members 28, the outer ends of which are attached to the outer ends of the arms 27, and the inner ends of which are attached to a pin 29 carried by the rectangular member 24, for centering this member about the axis of precession Z—Z, which is the axis of the studs 25 in the illustrated position.

As illustrated, an electrical contact member 32 is carried on a supporting arm 33 extending from the rectangular support 24 and is adapted to cooperatively engage the contact member 34 carried on a spring member 35 fixed at one end to control a circuit through conductors 36 and 37 in shunt relation to a portion of a resistor 38 connected between a source of electrical energy 39 and a field winding 42 for governing the voltage of a generator armature 43 to thereby control the supply of energy to a motor 44 which drives the worm screw feeding mechanism 2 through gears 45. The motor 44 is illustrated as provided with a field winding 46 to which energy is supplied from a suitable source 47.

Referring to Fig. 3, the motor 14 may be any suitable constant speed electrical motor, and the adjustable gear reduction mechanism 15 may be any suitable device, such as the well known transitorque gear reducing mechanism, having a range of speed adjustment at its output shaft of say, 1:10. The reduction gear mechanism 16 provided in this case may have a gear reduction ratio of approximately 600:1 to drive the disc 12 in one direction at a speed that is indicative of the desired rate of movement of the pug 4 from the pug mill 1. The shaft 6 that is shown in Fig. 1, as connecting the wheel 5 to the driving disc 7, is illustrated in Figs. 3 and 4 as passing through a bearing supporting casing 48, that is supported by suitable supports 51 and 52 from a supporting base 53. Suitable ball bearings 54 and 55 are provided within the casing 48 for carrying the shaft 6, and a spring 56 is provided extending between the ball bearing 55 and a ring 57 mounted within the casing to urge the shaft 6 and the friction disc 7 toward the right into frictional engagement with the roller 8. Similar means may be provided within the casing 16 for urging the disc 12 into frictional engagement with the roller 8.

The gyroscope structure illustrated in Figs. 3, 4 and 5 is essentially the same as that illustrated in Figs. 1 and 2, the shaft 19 upon which the moving parts of the gyroscope structure is supported being mounted in ball bearings provided in a supporting casing 58, that is mounted on the supports 59 and 61, which extend upwardly from the base 53. The various parts of the gyroscope mechanism illustrated in Figs. 1 and 2 are correspondingly numbered in Figs. 3, 4 and 5. It will be noted that a washer 62 is shown attached to the shaft of the revolving inertia element 22 by a set screw 63 in Figs. 3 and 5, which acts as an unbalancing counterweight to cause the inertia element to wobble about the axis X—X, that is, its axis of rotation or spin, to effect a vibratory action between the contact members 32 and 34.

The mounting of the roller 8 upon one end of the lever 9 and the movement of the levers 9 and 18, that are interconnected at their adjacent ends by flexible member 17 will best be understood by reference to Fig. 5. It will be understood that the U-shaped member 26 supporting the inertia element of the gyroscope is attached to move with the lever 18 about the axis of the shaft 19 indicated as the axes Y—Y in Figs. 1 and 2. A post 64 is shown in Figs. 3 and 5 extending upwardly from the base 53 and provided with a recess near the top thereof for receiving a pin 65 carried by the lever 9, the shoulders on the post 64 above and below the pin 65 limiting the degree of movement of the lever 9 about the shaft 13.

If the mechanism is in operation and the motor 14 is driving the disc 12 through the gear reduction mechanisms 15 and 16 that have been adjusted, the rate of movement of the disc 12 corresponds to the rate of movement of the disc 7 when the pug 4 is advanced from the pug mill 1 at the desired rate. Assume that the driving disc 12 is revolving in a direction such that the edge nearest the observer is moving downwardly and that the disc 7 is operating in a direction such that the edge nearest the observer is moving upwardly as viewed in the drawings. It will be appreciated that so long as the speeds of the disc 7 and 12 remain the same, the roller 8 between these discs will rotate about an axis that remains stationary. If the rate of movement of the pug 4 from the mill 1 decreases below its desired value, the friction wheel 5, in engagement therewith, and the driving disc 7 driven thereby will correspondingly reduce in speed so that the roller 8 will be carried slightly in the direction of the more rapidly moving disc 12, that is, away from the observer in Figs. 1 and 3, or downwardly in Figs. 4 and 5. This causes the lever 9 to rotate in a counterclockwise direction about the shaft 13 as viewed in Fig. 5, and the lever 18 to move in a clockwise direction a slight amount, moving the U-shaped member 26 and the parts carried thereby in a clockwise direction about the shaft 19, so that the contact member 32 carried on the lower portion of the rectangular supporting member 24 is moved toward the left or toward the contact member 34. This movement is responsive in direction and degree to the variation in the regulated quantity from its desired value which, in this case, is the rate of movement of the pug 4, and causes the short circuiting of the resistor 38 and a corresponding increase in the voltage of the generator 43, which is applied to the motor 44 to cause an increase in the motor speed to correspondingly increase the speed of the screw mechanism 2 and the rate of advance of the pug 4 from the mill. This movement of the rapidly rotating inertia element 22 about the axis of the shaft 19 also effects by virtue of the gyroscopic principle, a movement of the inertia element 22 and of the rectangular supporting member 24 about the axis Z—Z, known as the axis of precession. The direction of rotation of the movable element 22 is chosen such that this movement about the axis of precession causes the contact member 32 carried by the arm 33 to move in a direction to anticipate the correction to be effected by movement of the rotating element about the axis Y—Y, which is the axis of the shaft 19. That is to say, the direction of rotation of the inertia element 22 is chosen, in this case, to be in a clockwise direction, as viewed in Fig. 2, so as to cause a movement of the gyroscope in a counter-clockwise direction, as viewed in Fig. 1, to close the contact members 32 and 34 when moved in a clockwise direction, as viewed in Fig. 5, by the lever 18.

It will be appreciated that the amount of movement of the inertia element 22 about the axis of precession Z—Z is dependent upon the rate of movement of the inertia element about the axis Y—Y so that the initial movement of the gyroscope, that is, the clockwise movement of the inertia element 24 about the axis of the shaft 19 as viewed in Fig. 5, is dependent upon the amount of movement about the shaft 19, while the amount of precession or anti-hunting movement, that is, the movement about the axis Z—Z in line with the studs 25, in a clockwise direction as viewed in Fig. 1 or 3, is dependent upon the rate of movement about the axis of the shaft 19.

It will be appreciated that when the speeds of the discs 7 and 12 are in agreement, the vibratory action of the contact members 32 and 34 caused by the counter-weight 63 continuously completes and interrupts the shunt circuit through the conductors 36 and 37 to maintain the effective value of the resistor 38 such that the desired rate of movement of the pug 4 is maintained. Consequently, a movement of the contact member 32 toward the contact member 34 by movement of the gyroscope about either the axis Y—Y or the axis X—X increases the durations of the intermittent short circuits through conductors 36 and 38 to increase the voltage of the generator 43 and the speed of the motor 44 while the movement of the contact member 32 from the contact member 34 occasioned by movement of the inertia element of the gyroscope about either the Y—Y or X—X axes decreases the length of the intermittent short circuits of the resistor 38 to decrease its effective value and correspondingly decrease the voltage of the generator 43 and the speed of the motor 44.

If the pug 4 coming from the mill 1 advances at a rate above its desired value, the speed of the disc 7 correspondingly increases above the speed of the disc 12, thus causing the roller 8 to move in the direction of the disc 7, or in a clockwise direction as viewed in Fig. 5, about the axis of shaft 13, thus correspondingly moving the lever 9 and actuating the lever 18 in a counter-clockwise direction about the axis of the shaft 19, so that the contact member 32 is moved slightly away from the contact member 34 to decrease the speed of the motor 44 in a manner about to be explained. This movement of the inertia element 22 of the gyroscope in a counter-clockwise direction about the axis of the shaft 19 as viewed in Fig. 5, causes a precession thereof in a clockwise direction about the axis Z—Z of the studs 25, as viewed in Figs 1 and 3, to introduce an anti-hunting influence, causing the contact member 32 to anticipate the correction to be effected by the initial movement of gyroscope by the lever 18. This anticipatory movement of the member 24 about the axis Z—Z proceeds at a rate that is dependent upon the rate of movement of the gyroscope about the axis of the shaft 19.

Although my invention has been illustrated as applied to a particular industrial application, it will be appreciated that it may be applied to many situations where it is desired to govern the position of a controlled element to correspond to the position of a controlling element, or to control the speed of one device to correspond to the speed of a master or controlling device.

Many modifications in the apparatus and circuits illustrated may be made within the spirit of my invention and I do not wish to be limited otherwise than by the scope of the appended claims.

I claim as my invention:

1. In a regulator equipment, an inertia element constantly rotating about an axis, means for moving said inertia element about an axis at right angles to its axis of rotation in accordance with the variation in a regulated quantity from its desired value, means sensitive to the movement of said rotating element about an axis at right angles to each of said above two-named axes, and means governed by said movements about the last two-named axes for controlling a corrective influence to return the regulated quantity to its desired value.

2. In a regulator equipment, an inertia element constantly rotated about an axis and mounted to possess a freedom of motion about two axes, each at right angles to the axis of rotation and at right angles to each other, means responsive to a regulated quantity for moving said inertia element about one of said two axes in accordance with the direction and amount of the variation in said regulated quantity from its desired value, to cause the inertia element to precess about the other of said two-named axes an amount that is responsive to the rate of movement of the inertia device about the first of said two-named axes, the direction of rotation of said inertia element being chosen such that the last-named movement causes a corrective influence in a direction opposite to the previously named movement of the corrective force.

3. In a regulator equipment, an inertia device constantly rotated about an axis and mounted to possess a freedom of motion about two axes, each at right angles to the axis of rotation and at right angles to each other, means including electrical contact members controlled by said element for governing said regulated quantity, and means for unbalancing said inertia element to provide a vibration thereof about its axis of rotation, means for moving said inertia element about one of said two axes at right angles to its axis of rotation in accordance with the variation in a regulated quantity from its desired value.

4. In a regulator equipment, an inertia element constantly rotating about an axis, means for moving said inertia element about an axis at right angles to its axis of rotation in accordance with a variation in a regulated quantity from its desired value, means including electrical contact members controlled by said element, and means for unbalancing said inertia element to produce a vibrating action of said contact elements in accordance with the rotation of said inertia element, and means sensitive to the movement of said rotating element about its last-named axis for effecting a precession of said element about an axis at right angles to both of said two above-named axes in a direction to introduce an anti-hunting action into the control of said regulated quantity.

5. In a speed regulating system, in combination, a regulated motor, apparatus driven thereby, an element driven in accordance with the desired speed of said apparatus, an element driven in accordance with the actual speed of said apparatus, an inertia device constantly rotated about a desired axis and mounted to possess a freedom of motion about two axes at right angles to each other and to the axis of rotation of said inertia device, and means differentially responsive to the speeds of said two driven elements for actuating said inertia device about one of said two axes in response to the direction and amount of the variation in the speed of said apparatus from its desired value, the direction of rotation of said inertia device being chosen such that the precession thereof in accordance with the gyroscopic principle about the other of said two axes causes a corrective influence in the movement of said contact members that is opposite in direction to the initial movement thereof.

6. In a speed regulating system, in combination, a regulated motor, apparatus driven thereby, an element driven in accordance with the desired speed of said apparatus, an element driven in accordance with the actual speed of said apparatus, an inertia device constantly rotated about a desired axis and mounted to possess a freedom of motion about two axes at right angles to each other and to the axis of rotation of said inertia element, and means differentially responsive to the speeds of said two driven elements for actuating said inertia device about one of said last two-named axes in response to the direction and amount of the variation in the speed of said apparatus from its desired value, and means for unbalancing said inertia element to produce a vibrating action of said contact members in accordance with the rotation of said inertia element, means sensitive to the movement of said rotating element about its last-named axis for effecting a precession of said element about an axis at right angles to both of said two above-named axes in accordance with the gyroscopic principle in a direction to introduce an anti-hunting action into the control of said regulated quantity.

7. In a speed matching equipment, a prime mover, means driven by said prime mover, a member driven in accordance with the desired speed of said driven means, a member driven in accordance with the actual speed of said driven means, a differential element actuated in accordance with variations in the speed of the driven means from its desired speed, an inertia body constantly rotated about an axis and mounted to possess freedom of motion about two axes at right angles to the axis of rotation and to each other, means including a pair of contact members subject to control upon movement of said inertia member about either of said two axes for controlling the driven member, means for moving said inertia body about one of said two axes in accordance with the amount of a positional change of said differential element to cause the inertia body to precess about the other of said two named axes an amount that is responsive to the rate of movement of the inertia body about the first of said two main axes.

8. In a position regulator, a controlled member the position of which is being governed, a master member for determining the desired position of said controlled member, an inertia body constantly rotated about an axis and mounted to possess freedom of motion about two axes at right angles to the axis of rotation and to each other, means including a pair of contact members positioned to be actuated upon movement of said inertia member about either of said two axes for controlling the driven member, means for moving said inertia body about one of said two axes in accordance with the amount of movement of the controlled member from its desired position to cause the inertia body to precess about the other of said two main axes an amount that is responsive to the rate of movement of the inertia body about the first of said two main axes, the movements about said two main axes being so correlated that the second named movement causes a corrective influence in a direction opposite to that caused by the first named movement of the inertia body.

9. In a position regulator, a controlled member the position of which is being governed, a master member for determining the desired position of said controlled member, means including a pair of contact members for controlling the position of the controlled member to follow changes in the position of the master member, and a gyroscope actuated in response to the amount of positional change between the master and controlled members for controlling said contact members in accordance with the amount of the initial movement applied thereto, said gyroscope being arranged to further control said contact members by movement about its axis of precession in a direction to anticipate the correction instituted by the initial movement of the gyroscope.

CLINTON R. HANNA.